Nov. 20, 1962 — H. STRÖMBERG — 3,064,941
CAM ACTUATED VALVE

Filed April 13, 1959 — 2 Sheets-Sheet 1

United States Patent Office 3,064,941
Patented Nov. 20, 1962

3,064,941
CAM ACTUATED VALVE
Henry Strömberg, Lindas, Sweden, assignor to Claudo Aktiebolag, Stockholm, Sweden, a corporation of Sweden
Filed Apr. 13, 1959, Ser. No. 805,802
Claims priority, application Sweden May 3, 1958
3 Claims. (Cl. 251—260)

This invention relates to valves of the type having a hollow substantially cylindrical body of resilient material sealed in a housing so that a passage is formed around the body. The inner part of the cylindrical body is permanently separated from the passage and includes a movable member for laterally moving the body against a seat in the wall of the valve housing.

Such valves are known and the present invention has for its main object to provide an essentially improved construction of the valve, having the inherent valuable qualities of absence of packing boxes and is thus free from leakage, small adjustment forces for shutting the valve and a smooth flow path through the valve, causing only an infinitesimal loss of pressure in the flow of fluid.

The valve according to the invention is essentially characterized by the fact that the resilient body comprises a substantially solid main portion which is connected integrally to a resilient cylindrical collar or collars extending to one or both ends of it. The collar is non-turnably and tightly secured to the inner wall of the housing at a place axially spaced from the valve seat. The operating means of said valve body, preferably include a crank shaft or crank pin or an eccentric, which extends from the outside through the inside of the collar. The inside of the collar is sealed from the fluid passage of the valve. The crank pin or eccentric engages the main portion of the valve body so as to move it towards or away from the seat in the valve housing.

Preferably the main portion of the valve body and its integral collar or collars consist of the same resilient material, such as natural or synthetic rubber. However, the valve body may also consist of separate parts bonded together or of a chemically homogeneous material with locally different physical properties. Inserts of metal in the main portion may be provided in order to strengthen it or to form bearing surfaces for the valve operating means.

The invention has for its further object to provide for a rectilinear movement of the valve body which is attained by the fact that the crank pin or eccentric engages a hole in the main portion widened at right angle to its direction of movement. Although the collar is readily bent when the main portion is moved towards and against its seat the torsional stiffness of the collar is large enough substantially to prevent the valve body from rotating. Since the adjustment force from the crank pin for moving the valve body is applied against the latter in a direction parallel with the seat axis, and the valve body during that movement is permitted to move sideways freely, the valve body follows a substantially straight line when moved by the crank pin. It has been found that even a comparatively weak material in the collar prevents torsional deformation thereof.

Further objects and advantages will be apparent from the following description of two embodiments illustrated by way of example in the accompanying drawings.

Figure 1:
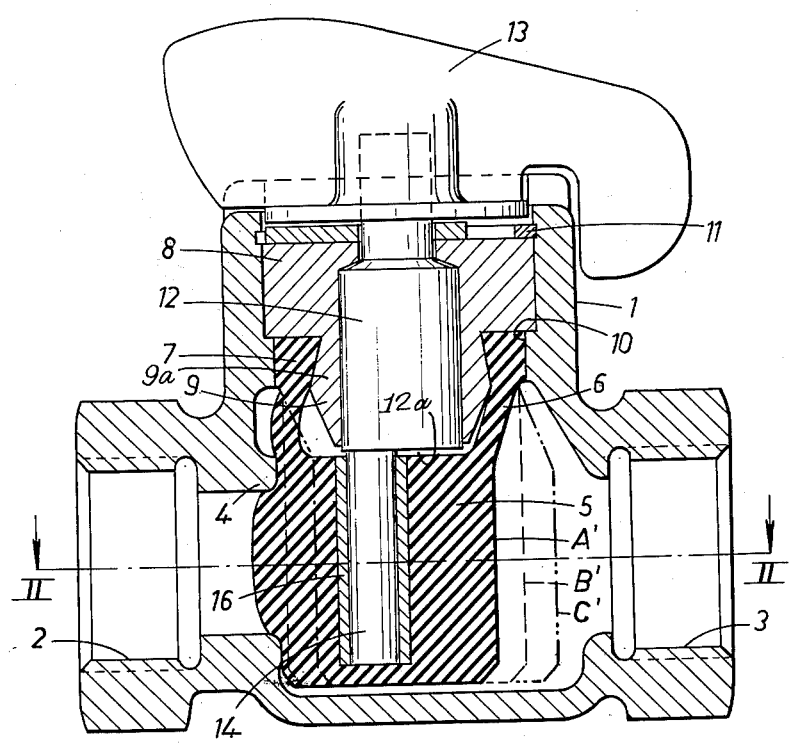
FIGURE 1 is an axial sectional view of a valve according to the invention.
Figure 2:
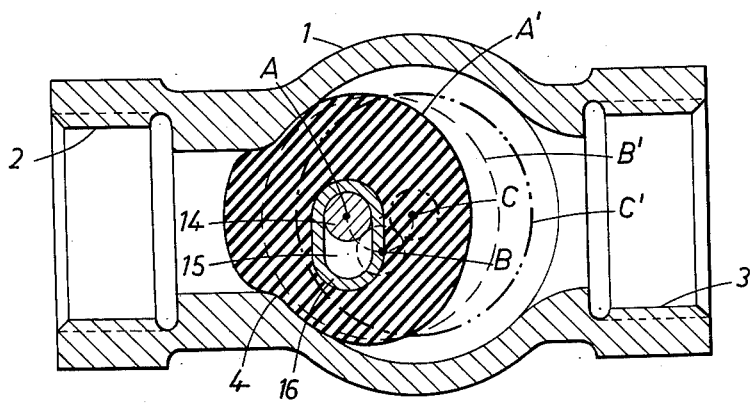
FIGURE 2 is a cross sectional view taken along the line II—II in FIGURE 1.

Referring now to FIGURES 1 and 2 a valve housing 1 comprises a substantially cylindrical shell having opposite openings 2 and 3 in its side wall at right angles to the axis of the shell. These openings are threaded to receive the threaded parts of pipes. One of the openings has a seat 4 following the inner cylindrical shape of the shell. However, it is to be noted that said seat may have another shape for instance a flat ring shape to cooperate with a spherical valve body.

In the embodiment shown the valve body of resilient material has generally the shape of a cylinder and comprises a main portion 5. It has fitted integrally to it a ring-shaped collar or sleeve 6 at the upper end face of the main portion and has an enlarged marginal rim portion 7 of section widening upwards by means of which the collar is tightly secured to the inner cylindrical wall surface 10 of the shell so that the rim portion 7 cannot rotate.

A cylindrical inset 8 is provided for securely retaining the rim portion 7 of the collar 6 in place and in sealing engagement with the cylindrical wall surface 10. For this purpose the inset member 8 has an inner portion 9 of upwardly and downwardly diverging double-conical shape. The upper one 9a of the conical parts has slightly larger dimensions than the inner part of the rim portion 7 so that when installed the rim portion 7 is compressed in the space between it the upper conical part 9a and the inner cylindrical wall surface 10 of the housing thereby immovably securing the rim portion 7.

It is to be noted that the compression of said rim portion 7 is determined only by the relative radial dimensions of the conical portion 9 of the inset 8 and the inner wall 10 of the housing 1. Thus the axial position of the inset 8 is of secondary importance which highly simplifies the manufacturing of the valve and permits the inset 8 to be axially fixed between an annular slit securing element 11 and a shoulder on the inner cylindrical wall surface 10 of the housing.

The means for moving the main portion 5 is a crank shaft 12 journalled in the inset 8. The crank shaft 12 extends outside the valve and has a handle 13. The crank pin 14 of the crank shaft 12 fits into a hole 15 in the main portion 5. This hole 15 is widened at right angle to the axis of movement of the valve body substantially as shown in FIGURE 2. Owing to this the crank pin 14 is permitted to move freely sideways in the hole when rotated by the crank shaft 12. Due to the above mentioned large torsional stiffness of the collar 6 and its own low modulus of elasticity the main portion 5 will move substantially rectilinearly towards and away from its seat 4.

Preferably the hole 15 is provided with a metal bushing 16. In FIGURE 2 the crank pin 14 is shown, by means of solid lines and respectively by means of broken lines, in three different positions A, B and C. A designates the closed position of the valve and C its fully open position. Between said two positions a third position, namely a mounting or central position B is shown, in which the valve body 5, 6 is in an unstretched condition and is concentric with the inner cylindrical wall surface 10 of the housing. In FIGURES 1 and 2 full and dotted circles showing corresponding positions of the outer periphery of the main portion 5 are designated A', B' and C' respectively.

The advantage of this arrangement lies in the fact that by the operation of the valve the main portion 5 will move equal distances to both sides from its central unstretched position to closed and fully open position respectively, whereby the collar 6 is only subjected to small deformations of substantially equal size.

It is to be noted that the hole 15 into which the crank pin 14 engages need not be concentrically located in the valve body but may be displaced in the direction of movement of the body. When mounting the parts of the valve the crank shaft is adjusted to a suitable angular position to fit with its crank pin into the hole 15.

The distance between the peripheral surface of the valve body in its mounting position (B) and the seat 4 depends on the location of the hole 15 and the compression of the valve body 5 against its seat 4. By suitably locating the hole 15, the seat 4 may be located to coincide with the cylindrical inner wall surface 10 of the housing 1 against which the rim portion 7 of the collar 6 is clamped, thereby highly facilitating the working of the seat 4 for instance by machining.

In the FIGURES 1 and 2 the surface of the seat 4 coincides with the inner wall surface 10 of the housing and the compression of the valve body 5 is considered to correspond substantially with the whole displacement of the main portion 5 of the valve body to the left (compare FIGURE 2) from its central position.

In the case the collar 6 is provided only at one side of the main valve body 5 as shown in FIGURE 1, the pressure from the fluid in the valve housing tends to urge the portion 5 upwardly. To support and fix the main portion 5 axially, when so urged the crank shaft 12 is provided with a broad lower surface 12a engaging the upper flat surface of the main portion 5 within the collar 6.

Figure 3:
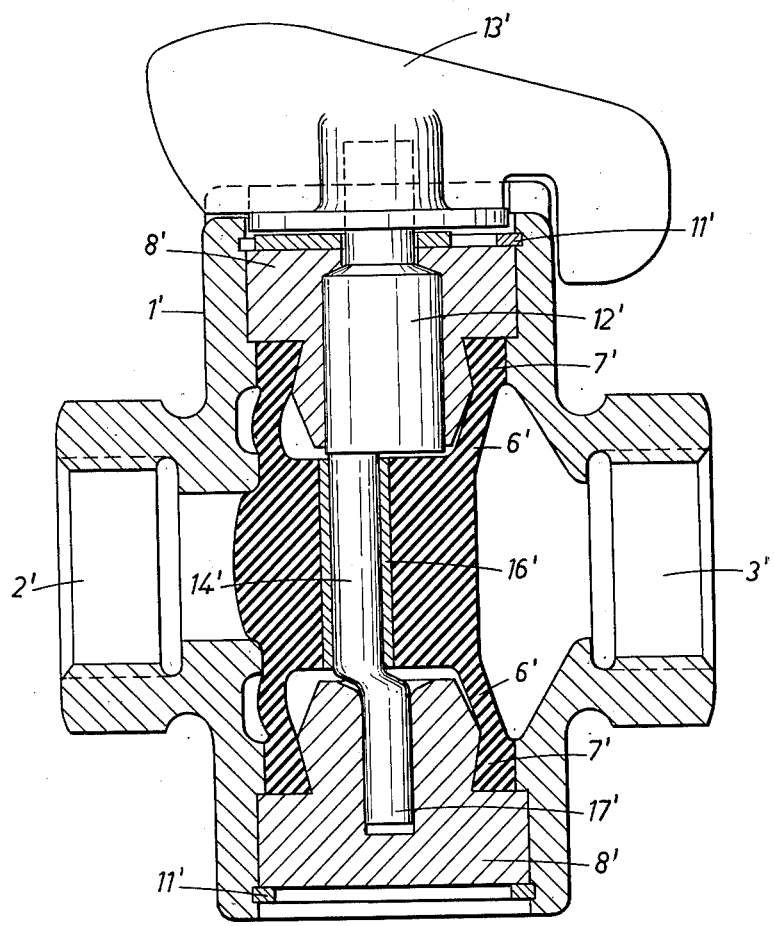
FIGURE 3 is an axial sectional view of a modified embodiment.

FIGURE 3 shows an embodiment which in point of principle is similar to that illustrated in FIGURES 1 and 2. Corresponding parts are numbered with the same numbers as in FIGURE 1 and 2 with "prime" indices added. This embodiment is provided with a central main portion 5' having collars 6' at both ends, which have enlarged rim portions 7' clamped to an inner cylindrical wall of the housing as described in connection with FIGURES 1 and 2. The crank pin 14' of the crank shaft 12' has a downward extension 17', coaxial with the crank shaft 12', journalled in a lower inset 8' held in place by a securing element 11'. By this construction the central main portion 5' of resilient material is not subjected to any axial forces from the fluid within the valve passage. Moreover the crankshaft 12', 14', 17' is journalled at both ends.

I claim:
1. A valve comprising a housing having inlet and outlet openings in the walls thereof; a cylindrical sleeve of resilient material forming a sealing connection with and extending into said housing at right agles to the axis of one of said openings provided with a seat and so that an annular passage is formed between it and the valve housing; a cylindrical body within said sleeve in register with said one opening and integral with said sleeve, said sleeve extending along said body throughout a substantial portion of the length thereof, a transversely widened axial hole defined in said body; and rotational operating means extending from outside through the sleeve and engaging said hole and exerting rotational torque including an axial force component to move said body and corresponding portion of the surrounding sleeve linearly into and out of engagement with the seat of said one opening, said sleeve having a torsional stiffness sufficient to resist rotational distortion by said rotational operating means.

2. In a valve, as claimed in claim 1, said sleeve being connected throughout its circumferential area to said body thereby guiding said body throughout the movement thereof.

3. A valve comprising a housing having inlet and outlet openings in the walls thereof; a cylindrical sleeve of resilient material forming a sealing connection with and extending into said housing at right angles to the axis of one of said openings, said one of said openings being provided with a seat and so that an annular passage is formed between it and the valve housing; a longitudinal body within said sleeve in register with said one opening and integral with said sleeve, said sleeve extending along said body for a major part of the length thereof, a transversely widened axial hole defined in said body, said body being displaced with respect to the axis of said sleeve in the direction of movement of said sleeve; and operating means extending from outside through the sleeve and comprising a crank shaft having a crank pin engaging said hole to move said body and corresponding portion of the sleeve linearly into and out of engagement with the seat of said one opening, while sliding in said widened hole transverse to the direction of movement of said body and sleeve, said sleeve having a torsional stiffness and low modulus of elasticity so as to resist rotational distortion by said crank shaft.

References Cited in the file of this patent
UNITED STATES PATENTS 2,812,154     Nordstrand     Nov. 5, 1957

FOREIGN PATENTS 209,548     Australia     of 1956